March 13, 1928.  1,662,339
J. C. SABEL
OPTICAL INSTRUMENT
Filed March 14, 1925
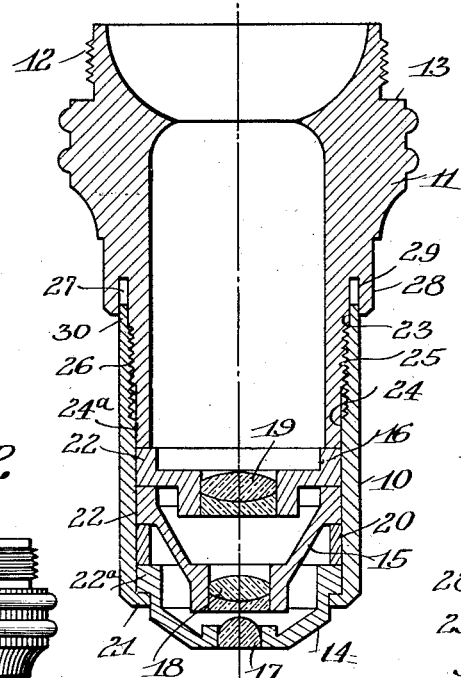
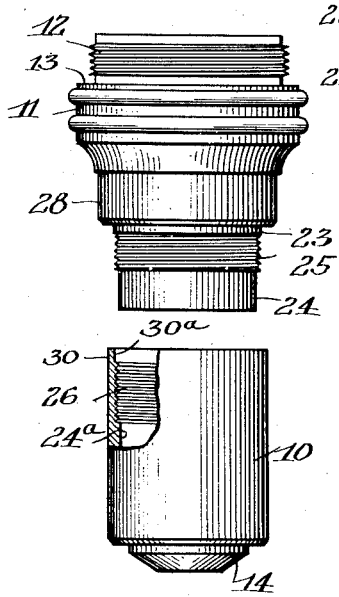
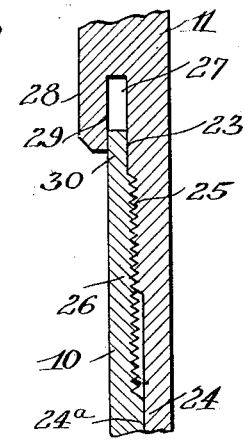
Inventor
John Charles Sabel
By Frederick F. Church
his Attorney Patented Mar. 13, 1928.

1,662,339

UNITED STATES PATENT OFFICE.

JOHN CHARLES SABEL, OF ROCHESTER, NEW YORK, ASSIGNOR TO BAUSCH & LOMB OPTICAL COMPANY, OF ROCHESTER, NEW YORK, A CORPORATION OF NEW YORK.

OPTICAL INSTRUMENT.

Application filed March 14, 1925. Serial No. 15,450.

The present invention relates to optical instruments, and particularly to mountings for optical systems, the object being to improve the efficiency of instruments of this kind and at the same time effect economy in their cost of manufacture.

A further object of the invention is to provide improved means for parfocalizing objective lens systems by improving upon the present forms of construction and methods of manufacturing the same.

A still further object is to provide improved means for centering the lens holding portion of the objective upon the base thereof, or that portion of the objective which is adapted to be attached to the microscope tube or nose piece.

To these and other ends the invention resides in certain improvements and combinations of parts, all as will be hereinafter more fully described, the novel features being pointed out in the claims at the end of the specification.

One embodiment of the invention is illustrated in the accompanying drawing in which Figure 1 is a central section of a microscope objective embodying the invention;

Figure 2 is a view showing the lens holder and base of the objective in a detached position to more clearly illustrate the parts adapted to effect the centering of one section upon another, and Figure 3 is an enlarged fragmentary section illustrating the relation of the bearing surfaces between the lens holding tube and base when the parts are in assembled position.

The present objective embodies a lens holding tube 10 and a base or mount 11 threaded at 12 for attachment to the microscope tube or the usual nose piece thereon, not shown, the base having an abutment or shoulder adapted to occupy a definitely fixed relation to the instrument with which the objective is to be connected, which may be the shoulder indicated at 13.

The lens system of the objective may include any well known arrangement of lenses, properly assembled and coordinated to afford the desired results. In the present embodiment I employ a series of individual lens rings or mounts indicated at 14, 15 and 16, carrying, respectively, the lenses 17, 18 and 19 which are secured upon the rings in any well known manner. A spacing member 20 is disposed between the rings 14 and 15 and is of a length to afford the correct spacing between the lenses 17 and 18. The outer end of the tube or casing 10 is provided with an abutment 21, in the form of an inturned flange which is preferably integral with the tube and adapted to receive and support the lens holding ring 14, which in turn supports the remaining lens rings as shown in Figure 1.

The annular portions 22 of the individual lens rings or mounts are accurately turned to correspond to the bore of the tube 10 whereby to maintain the several lens elements properly centered with respect to the tube. The rings are slidably disposed within the tube, being inserted from the top and forming when assembled an objective system which can be quickly removed from the tube, upon removal of the latter from the base 11.

The base or mount 11 is reduced at its front or lower end and provided with spaced inner and outer bearing portions 23 and 24, respectively, together with an exteriorly threaded portion 25 between said bearing portions to receive the internally threaded portion 26 of the tube 10. The base is preferably provided with a longitudinally extending groove 27 formed between the bearing portion 23 and an annular portion 28 of the base, having an interior surface 29 which may be employed as a bearing surface for the rear end portion 30 of the tube 10 if desired, along with the bearing surface 23 which is adapted to form a bearing for the inner surface of said end portion 30. The end portion 24 of the base is accurately turned to closely fit the bearing surface 24ᵃ of the tube 10 while the bearing portion 23 of said base is accurately turned to closely fit the somewhat larger bore 30ᵃ of the rear end 30 of the tube. The advantage in this arrangement is that the lens holding tube is positively centered with respect to the base 11 when screwed thereon, so that the axis of the lens system is always properly centered with respect to said base and likewise with respect to the microscope tube upon which the base is mounted. Heretofore the threaded portions of the tube and base have been relied on to center and hold the one with respect to the other, but it has been found that for the fineness of adjustment required to insure against decentration of objective lens systems in instruments of the present type that such means of alinement is not reliable, particularly when the threads become worn or in cases where they are not properly cut during the manufacture of the parts. The present arrangement, therefore, affords an extremely accurate means for centering the lens system with respect to the axis of the base, and the microscope tube as well, independently of the threaded connection between the relatively movable parts of the objective. This is assured by reason of the fact that the base 11 is mounted upon an absolutely true running chuck or spindle when the bearing portions of the base are to be turned down whereby they are made to accurately agree with the diameters of the surfaces upon the tube with which they engage, the bearing portions of the tube being also formed in the same manner, so that the tube will be centered upon the base regardless of any inaccuracies in the threads connecting the two sections of the objective.

The bearing portion 24 of the base in addition to forming a centering means for the tube also forms a means for clamping the lens holding rings in position as shown in Figure 1, thus performing a double function in its use.

Another important feature of this particular construction is that the extended bearing portion 24 forms a means by which parfocalization of the objective is effected, by which is meant that the particular lens system carried by the casing 10 is properly adjusted with respect to a shoulder or abutment on the base 11, such as the shoulder 13 which is adapted to occupy a definitely fixed relation to the instrument with which the base is connected. In other words, a series of microscope objectives is said to be parfocal when their lens systems are correctly adjusted with respect to a certain shoulder or shoulders on those portions of the objective which are attached to the instrument, when said shoulders bear a definitely fixed relation to the instrument. This adjustment is effected by altering the length of the bearing portion 24 of the base when completing the objective at the time of assembling the several parts thereof, the correct length being determined in each case at the time of assembling, the end of said portion 24 being ground off as much as may be necessary to afford the desired adjustment, it being understood that these portions are originally made long enough to allow for the maximum amount of reduction that may be required.

The present objective is one in which the steps of assembling, centering and parfocalizing of the lens system are all accurately effected in an economical and efficient manner, the construction being such that considerable time is saved in assembling and connecting the several parts of the objective, due to the fact that the lens rings are simultaneously centered within the tube 10 when inserted therein and the tube itself being accurately centered upon the base when screwed thereon.

It will be seen therefore that the methods employed in the present invention, as well as the forms of construction shown, not only afford economy in manufacture, but assure more accurate results in the construction of the objective, whereby their efficiency is increased.

I claim as my invention:

1. In optical instruments, an objective including a base and a lens tube threadedly connected with the base, said base having a smooth extended bearing portion projecting into the lens tube and closely fitting the bore of the latter in advance of the threaded portion of the bore, whereby to accurately center said tube upon the base when screwed thereon.

2. In optical instruments, an objective including a base threaded exteriorly adjacent one end and having a smooth bearing portion adjacent said threaded portion and a lens holding tube threaded interiorly and adapted to screw upon the threaded portion of the base and having an interior portion finished to the diameter of said bearing portion and adapted to receive the latter to accurately center the tube upon the base.

3. In optical instruments, an objective embodying an exteriorly threaded base and a lens tube threaded thereon and having an abutment and a lens holding element slidably disposed within the tube and held against movement in one direction by said abutment, the base having a smooth bearing portion projecting into the lens tube and closely fitting a wall of the latter, whereby to accurately center the tube upon the base when screwed thereon, said bearing portion engaging said lens holding element to prevent longitudinal displacement of the same.

4. In optical instruments, an objective embodying a base threaded exteriorly adjacent one end and terminating at said end in a reduced cylindrical extension, a lens tube screwed upon said base and having an internal bore closely fitting said extension and also having an abutment and a plurality of lens holding elements slidably disposed within the tube and held against longitudinal movement in one direction by said extension and in the opposite direction by the abutment.

5. In optical instruments, an objective embodying a threaded lens tube having a lens holding element slidably disposed therein and held against outward movement thereby, and a base screwed into the tube and having a smooth bearing portion rigid thereon and adapted to closely fit the inner surface of said tube to center the latter upon the base, said bearing portion being adapted to engage said lens holding element to prevent displacement of the latter and serving at the same time to limit movement of the tube longitudinally with respect to the base.

6. In optical instruments, an objective embodying a base having inner and outer bearing portions rigid thereon and disposed exteriorly thereof with a threaded portion disposed between said bearing portions, a tube screwed upon said threaded portion and having spaced interior portions adapted to closely engage said bearing portions to center the tube upon the base, and a lens holding element within the tube adapted to be held against longitudinal displacement in one direction by said outer bearing portion.

7. In optical instruments, an objective embodying a base having front and rear cylindrical bearing portions of different diameters with an exterior threaded portion between said bearing portions, a tube screwed upon said threaded portion and having portions adapted to engage said bearing portions to center the tube upon the base, and lens holding means disposed within the tube and forming a stop for limiting the movement of the latter longitudinally with respect to the base.

JOHN C. SABEL.